US009938674B2

(12) United States Patent
Engelmann et al.

(10) Patent No.: US 9,938,674 B2
(45) Date of Patent: Apr. 10, 2018

(54) COLD PLANER TRANSPORT PAYLOAD MONITORING SYSTEM

(71) Applicant: Caterpillar Paving Products Inc., Brooklyn Park, MN (US)

(72) Inventors: Eric S. Engelmann, Delano, MN (US); Conwell K. Rife, Jr., Wayzata, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 14/722,231

(22) Filed: May 27, 2015

(65) Prior Publication Data

US 2016/0348324 A1   Dec. 1, 2016

(51) Int. Cl.
*E01C 23/088* (2006.01)
*E01C 23/12* (2006.01)
*G01F 22/00* (2006.01)
*E01C 23/01* (2006.01)

(52) U.S. Cl.
CPC ............ *E01C 23/088* (2013.01); *E01C 23/01* (2013.01); *E01C 23/127* (2013.01); *G01F 22/00* (2013.01)

(58) Field of Classification Search
CPC ...... E01C 23/088; E01C 23/127; E21C 47/00; E21C 47/02; G05B 19/23; G06Q 50/04
USPC .............................................. 701/50; 700/164
See application file for complete search history.

(56) References Cited

U.S. PATENT DOCUMENTS

| 4,852,674 A | 8/1989 | Gudat |
| 5,850,341 A | 12/1998 | Fournier et al. |
| 8,296,019 B2 | 10/2012 | Kendrick |
| 8,363,210 B2 | 1/2013 | Montgomery |
| 8,528,988 B2 | 9/2013 | Von Schonebeck et al. |
| 9,522,415 B2 | 12/2016 | Bamber et al. |
| 9,562,334 B2 | 2/2017 | Von der Lippe et al. |
| 2008/0153402 A1* | 6/2008 | Arcona .................. B24B 7/188 451/352 |

(Continued)

FOREIGN PATENT DOCUMENTS

| DE | 102013004995 | 9/2014 |
| WO | 2015034497 | 3/2015 |

OTHER PUBLICATIONS

Pending U.S. Appl. No. 14/796,988, by John L. Marsolek et al., "Cold Planer Loading and Transport Control System"; filed Jul. 10, 2015.

*Primary Examiner* — John J Kreck
*Assistant Examiner* — Michael A Goodwin
(74) *Attorney, Agent, or Firm* — Finnegan, Henderson, Farabow, Garrett & Dunner, LLP; Timothy A. Parker

(57) ABSTRACT

A control system for a cold planer having a milling is disclosed. The control system may include a depth sensor configured to generate a first signal indicative of a milling depth below a work surface, a speed sensor configured to generate a second signal indicative of a ground speed of the cold planer, and a profile detection device mountable to the cold planer at a location forward of the milling drum. The profile detection device may be configured to generate a third signal indicative of a width profile of the surface. The control system may further include a controller in communication with the profile detection device, the depth sensor, and the speed sensor. The controller may be configured to determine a volume of a milled material based on the first, second, and third signals.

16 Claims, 3 Drawing Sheets

(56) References Cited

U.S. PATENT DOCUMENTS

| | | | |
|---|---|---|---|
| 2011/0080034 A1* | 4/2011 | Schonebeck | E01C 23/088 299/1.5 |
| 2012/0104828 A1* | 5/2012 | Grathwol | E01C 23/088 299/1.5 |
| 2013/0076101 A1 | 3/2013 | Simon | |
| 2013/0080000 A1* | 3/2013 | Von der Lippe | E01C 23/088 701/50 |
| 2014/0097665 A1* | 4/2014 | Paulsen | G01B 11/00 299/39.4 |
| 2014/0244208 A1 | 8/2014 | Paulsen et al. | |

* cited by examiner

COLD PLANER TRANSPORT PAYLOAD MONITORING SYSTEM

TECHNICAL FIELD

The present disclosure relates generally to a cold planer and, more particularly, to a cold planer having a transport payload monitoring system.

BACKGROUND

Asphalt-surfaced roadways are built to facilitate vehicular travel. Depending upon usage density, base conditions, temperature variation, moisture levels, and/or physical age, the surfaces of the roadways eventually become misshapen and unable to support wheel loads. In order to rehabilitate the roadways for continued vehicular use, spent asphalt is removed in preparation for resurfacing.

Cold planers, sometimes also called road mills or scarifiers, are used to break up and remove layers of an asphalt roadway. A cold planer typically includes a frame propelled by tracked or wheeled drive units. The frame supports an engine, an operator's station, a milling drum, and conveyors. The milling drum, fitted with cutting tools, is rotated through a suitable interface with the engine to break up the surface of the roadway. The broken up roadway material is deposited by the milling drum onto the conveyors, which transfer the broken up material into haul trucks for removal from the worksite. As haul trucks are filled, they are replaced with empty haul trucks. The filled trucks transport the broken up material to a different location to be reused as aggregate in new asphalt or otherwise recycled. This transport process repeats until the milling process is finished.

Operators may wish to fill each truck to its maximum capacity before replacing it with an empty truck in order to reduce waste and improve efficiency. However, regulations that impose vehicle weight limits on some roadways may require operators to fill trucks below their maximum allowable capacity, and pay an associated fine when the weight limit is exceeded. Thus, operators visually estimate how much material has been loaded into a truck and, from that visual estimation, determine whether the truck has reached its maximum legal weight. Visual estimations, however, can be inaccurate.

One attempt to more accurately monitor truck filling is disclosed in U.S. Pat. No. 5,850,341 that issued to Fournier et al, on Dec. 15, 1998 ("the '341 patent"). In particular, the '341 patent discloses a system for measuring the weight of bucket loads of material that are emptied into a truck by a loading machine. Sensors attached to the loading machine measure hydraulic cylinder pressures and a lift angle associated with machine's loading equipment as bucket loads of material are lifted and emptied into the truck. A controller calculates the weight of each bucket load based on the cylinder pressures and the lift angle, and tracks a running sum of the weight of successive bucket loads emptied into the truck. When the truck is filled to a desired degree, the operator presses a button to store the truck's payload weight in a database and reset the bucket count for the next truck.

While effective in some applications, the truck filling monitoring system of the '341 patent may not address how to monitor material removal from machines that continuously mill material from a work surface during operation. Also, while the monitoring system of the '341 patent is only concerned with measuring the weight of loaded material, other measurements and/or determinations can be important in monitoring material removal.

The cold planer of the present disclosure solves one or more of the problems set forth above and/or other problems in the art.

SUMMARY

In one aspect, the present disclosure is related to a control system for a cold planer having a milling drum. The control system may include a depth sensor configured to generate a first signal indicative of a milling depth below a work surface, a speed sensor configured to generate a second signal indicative of a ground speed of the cold planer, and a profile detection device mountable to the cold planer at a location forward of the milling drum. The profile detection device may be configured to generate a third signal indicative of a width profile of the work surface. The control system may further include a controller in communication with the profile detection device, the depth sensor, and the speed sensor. The controller may be configured to determine a volume of a milled material based on the first, second, and third signals.

In another aspect, the present disclosure is related to a method of operating a cold planer having a milling drum. The method may include determining a milling depth below a work surface, determining a ground speed of the cold planer, and detecting a width profile of the work surface forward of the milling drum. The method may further include determining a volume of a milled material based on the milling depth, the ground speed, and width profile.

In yet another aspect, the present disclosure is directed to a cold planer. The cold planer may include a frame, a traction device connected to the frame and configured to propel the cold planer, a milling drum connected to the frame, a conveyor located adjacent the milling drum and configured to load milled material into a receptacle, and an operator station supported by the frame. The cold planer may also include a depth sensor configured to generate a first signal indicative of a milling depth below a work surface, a speed sensor configured to generate a second signal indicative of a ground speed of the cold planer, and a profile detection device mounted forward of the milling drum. The profile detection device may be configured to generate a third signal indicative of width profile of the work surface. The cold planer may also include a controller in communication with the profile detection device, the depth sensor, and the speed sensor. The controller may be configured to determine a volume of a milled material based on the first, second, and third signals, determine a weight of the milled material based on the volume, and determine a fill level of the receptacle based on at least one of the volume and the weight of the milled material.

DETAILED DESCRIPTION

For the purpose of this disclosure, the term "asphalt" is defined as a mixture of aggregate and asphalt cement.

Asphalt cement is a brownish-black solid or semi-solid mixture of bitumens obtained as a byproduct of petroleum distillation. The asphalt cement can be heated and mixed with the aggregate for use in paving roadway surfaces, where the mixture hardens upon cooling. A "cold planer" is defined as a machine used to remove layers of hardened asphalt from an existing roadway. It is contemplated that the disclosed cold planer may also or alternatively be used to remove cement and other roadway surfaces, or to remove non-roadway surface material such as in a mining operation.

Figure 1:
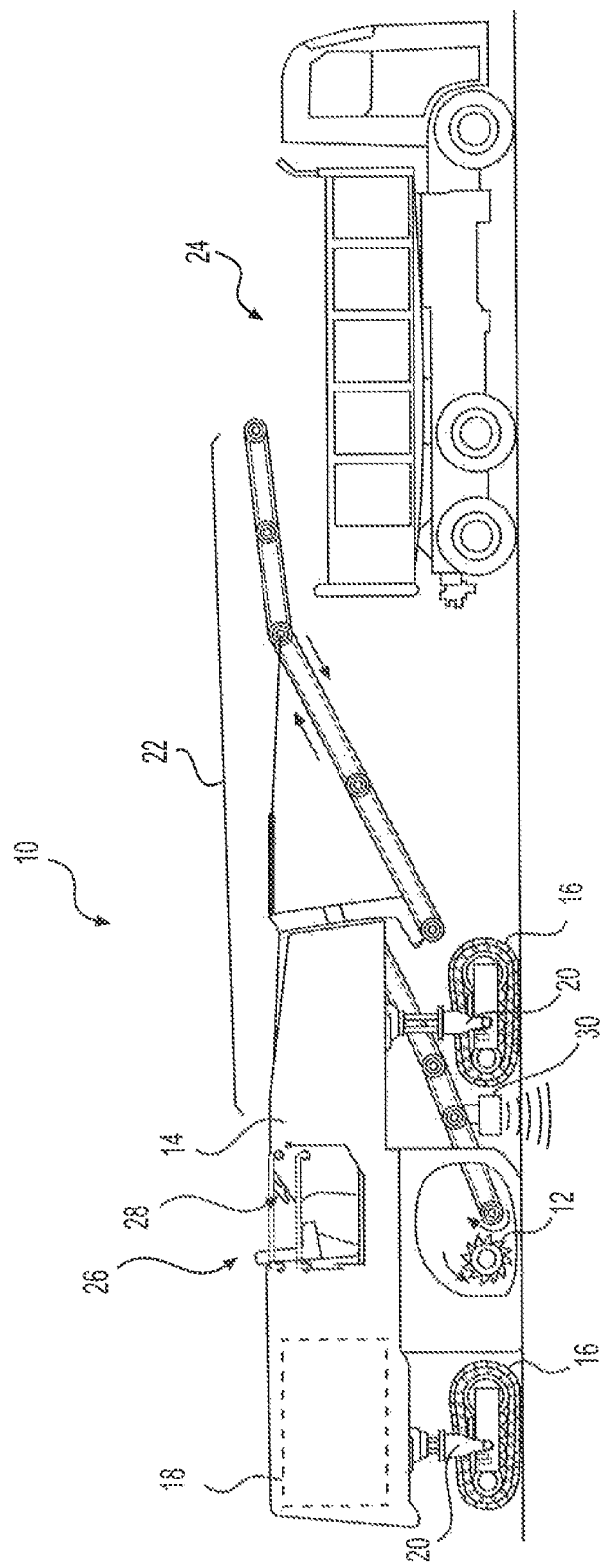
FIG. 1 is a cutaway view illustration of an exemplary disclosed cold planer.

FIG. 1 illustrates an exemplary cold planer 10 having a frame 14 supported by one or more traction devices 16, a milling drum 12 rotationally supported under a belly of frame 14, and an engine 18 mounted to frame 14 and configured to drive milling drum 12 and traction devices 16. Traction devices 16 may include either wheels or tracks connected to actuators 20 that are adapted to controllably raise and lower frame 14 relative to a ground surface. It should be noted that, in the disclosed embodiment, raising and lowering of frame 14 may also function to vary a milling depth D (referring to FIG. 2) of milling drum 12 into a work surface 17. In some embodiments, the same or different actuators 20 may also be used to steer cold planer 10 and or to adjust a travel speed of traction devices 16 (e.g., to speed up or brake traction devices 16), if desired. A conveyor system 22 may be connected at a leading end to frame 14 and configured to transport material away from milling drum 12 and into a receptacle, such as a waiting haul vehicle 24. Other types of receptacles may be used, if desired.

Frame 14 may also support an operator station 26 at a side opposite milling drum 12. It is understood, however, that operator station 26 may be located elsewhere on frame 14, if desired. Operator station 26 may house any number of interface devices 28 used to control cold planer 10. In the disclosed example, interface devices 28 include, among other things, a display 28a, a warning device 28b, and an input device 28c (28a-c shown only in FIG. 2). Display 28a may be configured to render the location of cold planer 10 (e.g., of milling drum 12) relative to features of a jobsite (e.g., milled and/or unmilled parts of work surface 17), and to display data and/or other information to the operator. Warning device 28b may be configured to audibly and/or visually alert the operator of cold planer 10 as to a proximity of milling drum 12 to the jobsite features, and/or when certain pieces of data exceed an associated threshold. Input device 28c may be configured to receive data and/or control instructions from the operator of cold planer 10. Other interface devices control devices) may also be possible, and one or more of the interface devices described above could be combined into a single interface device, if desired. In other embodiments, operator station 26 may be offboard cold planer 10. For example, operator station 26 may embody a remote control, such as a handheld controller, that an operator may use to control cold planer 10 from anywhere on a jobsite. Operator station 26 may alternatively embody a software program and user interface for a computer, and may include a combination of hardware and software. In other embodiments, cold planer 10 may be autonomous and may not include operator station 26.

Input device 28c may be, for example, an analog input device that receives control instructions via one or more buttons, switches, dials, levers, etc. Input device 28c may also or alternatively include digital components, such as one or more soft keys, touch screens, and/or visual displays. Input device 28c may be configured to generate one or more signals indicative of various parameters associated with cold planer 10 and/or its surrounding environment based on input received from the operator.

For example, input device 28c may be configured to receive an operator selection indicative of a density $\rho$ associated with the material being milled by milling drum 12. Surface 17 may be paved with different types of asphalt that may include different ingredients (e.g., limestone, granite, etc.), which may also be finer or coarser depending on the application. Thus, each type of asphalt may have a different mass (and weight) per unit volume. As a result, a certain volume of material milled from a first surface 17 may have a different weight than an equal volume milled material from a second surface 17, which may increase the weight of haul vehicle 24 by a different amount when filled with the same volume of material. Input device 28c may be configured to allow the operator to select a type of milled material (e.g., having a predetermined associated density $\rho$) from a list or to manually enter the density $\rho$ of the milled material. The density $\rho$ may be sent to and/or stored in a controller 42 (referring to FIG. 2) and used for further processing.

Input device 28c may also be configured to receive an operator selection indicative of a type of receptacle in which milled material is being deposited. For example, the operator may select haul vehicle 24 from a list of different types of haul vehicles and/or other types of partially mobile or stationary receptacles. A predetermined volumetric capacity, shape or image, tare weight, and/or other parameters may be associated with each type of receptacle. Input device 28c may also or alternatively be configured to allow the operator to manually enter the volumetric capacity, shape, tare weight, and/or other parameter. The receptacle information may be sent to and/or stored in controller 42 (referring to FIG. 2) and used for further processing.

Input device 28c may also be configured to receive an operator selection indicative of a vehicular weight limit $W_L$ (e.g., the weight limit of haul vehicle 24). Weight limits may be imposed on particular roadways by governing authorities (e.g., which may carry associated fines and/or penalties for infraction) or by fleet operators (e.g., to achieve optimum efficiency). Input device 28c may be configured to allow the operator to select from a predetermined list or to manually enter the weight limit $W_L$. The weight limit $W_L$ may be sent to and/or stored in controller 42 (referring to FIG. 2) and used for further processing.

Figure 3:
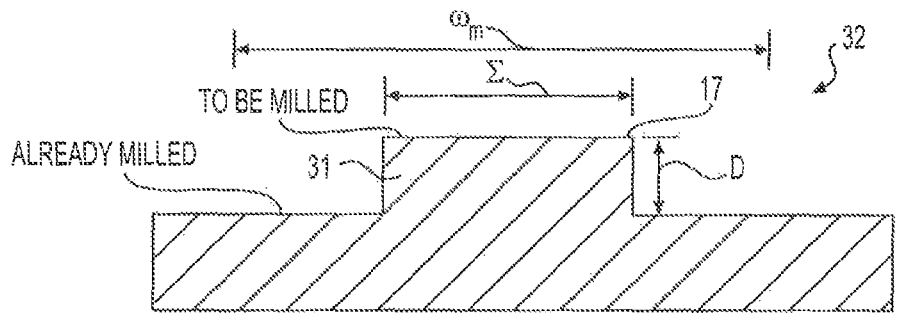
FIGS. 3 and 4 are front-facing cross section views of an exemplary work surface.

A profile detection device ("device") 30 may be mounted to cold planer 10 at a location forward of milling drum 12, relative to a normal cutting or working direction. Device 30 may be configured to detect a width profile $\Sigma$ of surface 17 in front of milling drum 12. As shown in FIG. 3, the width profile $\Sigma$ of surface 17 may be the width of one or more portions of surface 17 in front of milling drum 12 that has not yet been milled to the milling depth D. The width profile $\Sigma$, along with the milling depth D and a distance traveled by cold planer 10, may be used to calculate a volume V of material milled by cold planer 10. The volume V of milled material may be running sum of material that has been milled from surface 17 since the beginning of a milling operation and/or a running sum of material that has been loaded into a particular haul vehicle 24. The width profile $\Sigma$ and milling depth D may also or alternatively be used in conjunction with velocity and time data to determine a volumetric rate of material removal, if desired.

In some situations, the volume V of milled material may be readily determined, such as when the width profile $\Sigma$ of surface 17 is at least as wide as a width $\omega_m$ of milling drum 12, the milling depth D is constant during the milling operation, and surface 17 is flat and even. That is, the volume V of milled material may be equal to the width $\omega_m$ of milling drum 12 multiplied by the milling depth D and the distance traveled. In other situations, however, the width profile Σ of surface 17 may be narrower that the width $\omega_m$ of milling drum 12.

For example, cold planer 10 may be used to make multiple passes during the milling process in order to mill the entirety of surface 17. In some situations, a subsequent pass may partially overlap a previous pass, such that the full width $\omega_m$ of milling drum 12 is not exposed to unmilled portions of surface 17. Unmilled portions of surface 17 may refer to portions of surface 17 that have yet to be milled at all or that have not yet been milled to the currently set milling depth D. In other situations, the milling process may include starting at one side of surface 17 and gradually moving toward the other side until only one pass remains that is narrower than the width $\omega_m$ of milling 12. In one situation, as shown in FIG. 3, the milling process may include milling a perimeter of surface 17 and gradually reducing the unmilled portion until only a strip 31 remains in the center. When cold planer traverses an unmilled portion of surface 17 that is narrower than the width $\omega_m$ of milling drum 12, such as strip 31, the volume V of milled material cannot be accurately calculated simply by multiplying the width $\omega_m$ of milling drum 12 by the milling depth D and the distance traveled along the strip 31.

Thus, device 30 (referring to FIG. 1) may be configured to detect the width profile Σ of surface 17 in front of milling drum 12, including any portions that may be narrower than milling drum 12, and generate a signal indicative of the width profile Σ that may be used to determine the volume V of milled material. Device 30 may be any type of device known in the art for detecting a width profile of a surface.

In one embodiment, device 30 may be configured to detect the width profile Σ of surface 17 using a laser (e.g., a laser sensor). That is, device 30 may be configured to cast a laser stripe onto surface 17 and detect a reflection of the stripe off surface 17. Based on the reflection, device 30 may generate a signal indicative of the width profile Σ of work surface 17 and communicate the signal to controller 42 (referring to FIG. 2) for further processing.

In another embodiment, device 30 may detect the width profile Σ of surface 17 using ultrasonic sound waves (e.g., an ultrasonic sensor). For example, device 30 may direct ultrasonic sound waves at surface 17 and detect the waves as they reflect off surface 17. Based on the reflected waves, device 30 may generate a signal indicative of the width profile Σ of work surface 17 and communicate the signal to controller 42 (referring to FIG. 2) for further processing. Other types of profile detection devices may be used, if desired. Although shown as being connected to conveyor system 22, it is contemplated that device 30 could alternatively be connected to cold planer 10 at a location closer to milling drum 12, for example to a front cover of a drum enclosure or to frame 14, if desired.

When the milling depth D is constant throughout the milling operation, and surface 17 is flat and even, the volume V of milled material may be determined based on a 1-D profile of surface 17 (i.e., a linear width of the unmilled portion of surface 17). Thus, device 30 may be configured to generate a signal indicative of a 1-D width profile Σ. However, in some situations, such as where multiple passes have been made over surface 17 at various different milling depths D, additional information about the width profile Σ may be required in order to calculate the volume V of milled material.

Figure 4:
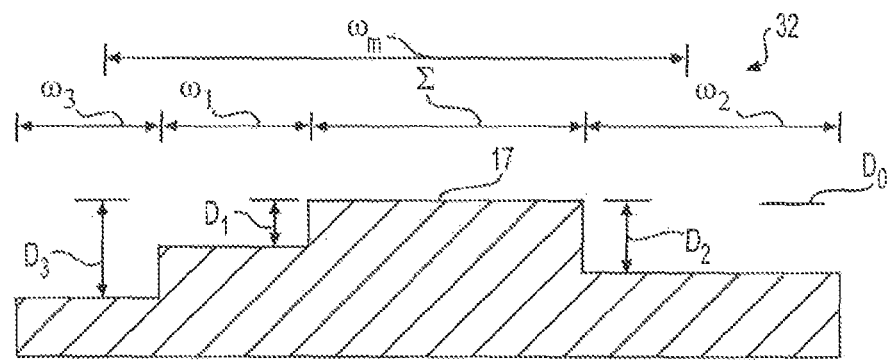

For example, as shown in FIG. 4, a portion of surface 17 may remain unmilled (e.g., at a depth $D_0$) after a first pass was made at a first twilling depth $D_1$, and a second pass was made at a second milling depth $D_2$ some distance from the first pass. A third pass at a third milling depth $D_3$ may partially overlap the first pass, and the width $\omega_m$ of milling drum 12 may span at least a portion of each of the first three passes in order to make a fourth pass over the unmilled portion. To calculate the volume V of material milled during the fourth pass, it may be helpful to know the widths $\omega_1$-$\omega_3$ of each portion of surface 17 at each milling depth $D_0$-$D_3$. Accordingly, device 30 (referring to FIG. 1) may be configured to detect and generate a signal indicative of a 2-D width profile Σ. For example, the 2-D width profile Σ may be a cross-sectional mapping indicative of both the widths $\omega_1$-$\omega_3$ and depths $D_0$-$D_3$ of each portion of surface 17, as shown in FIG. 4. This profile Σ may be used in conjunction with the current milling depth D and distance traveled by cold planer 10 to calculate the volume V of milled material.

Figure 5:
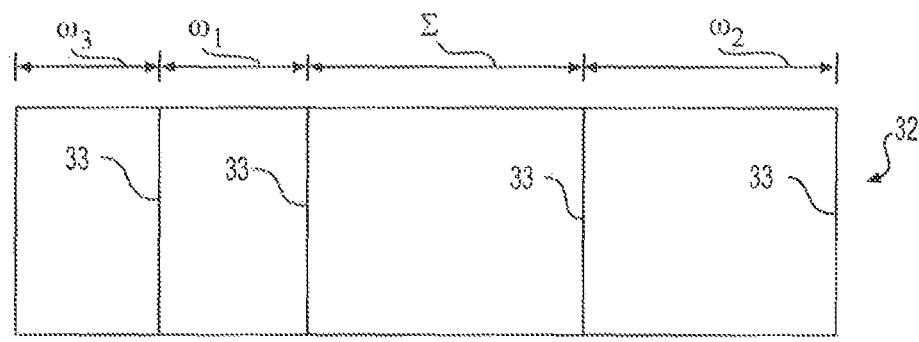
FIG. 5 is a top view of an exemplary work surface.

Alternatively, the 2-D width profile Σ may be a mapping of a top area 32 of surface 17 that delineates each portion of varying depth and indicates the width associated with each portion. As shown in FIG. 5, width $\omega_1$-$\omega_3$ may be delineated by edge lines 33 separating each portion of surface 17 at each depth $D_0$-$D_3$. Device 30 may be configured to identify edge lines 33 or other features of surface 17 to determine the widths $\omega_1$-$\omega_3$ of each portion. This profile Σ may be used in conjunction with the current milling depth D, historic depth data (e.g., the recorded milling depths $D_0$-$D_3$ during previous passes, positioning data during previous passes, etc.), and the distance traveled by cold planer 10 to determine the volume V of milled material.

In some situations, the milling depth D may be a uniform depth across milling drum 12. In other situations, the milling depth D may vary from one end of milling drum 12 to the other. That is, milling drum 12 may be angled such that a deeper cut is made at one end of milling drum 12, and a shallower cut is made at the other end. In this situation, the milling, depth D may encompass a varying cutting depth across the width $\omega_m$ of milling drum 12. When milling drum 12 is angled, each pass may create a width profile Σ such that each depth $D_0$-$D_3$ varies along a respective width $\omega_1$-$\omega_3$. Accordingly, device 30 may be configured to detect the depth D along the width profile Σ as the depth D varies.

In other embodiments, device 30 may be configured to determine a 3-D profile of surface 17, which may be used to calculate the volume V of milled material generated during a milling operation. That is, device 30 may be configured to detect and generate a signal indicative of a 3-D representation of the space in front of milling drum 12, which may be used to determine the width profile Σ of surface 17. Additionally, when the distance traveled by cold planer 10 is not available (e.g., based on positioning data, velocity and time data, etc.), or the milling depth D cannot be readily determined, the 3-D profile may be used to additionally supply depth data and/or distance data (e.g., the distance traveled by cold planer 10, the length of a pass or portion of a pass corresponding to one or more milling depths and/or widths, etc). For example, device 30 may be a 3-D scanner (e.g., a laser scanner), or may include multiple 2-D scanners and/or other detection devices or components (e.g., optical scanners) whose output may be configured to produce a 3-D profile. In this way, a 3-D profile of the volume of surface 17 in front of milling drum can be detected and used for further processing.

Figure 2:
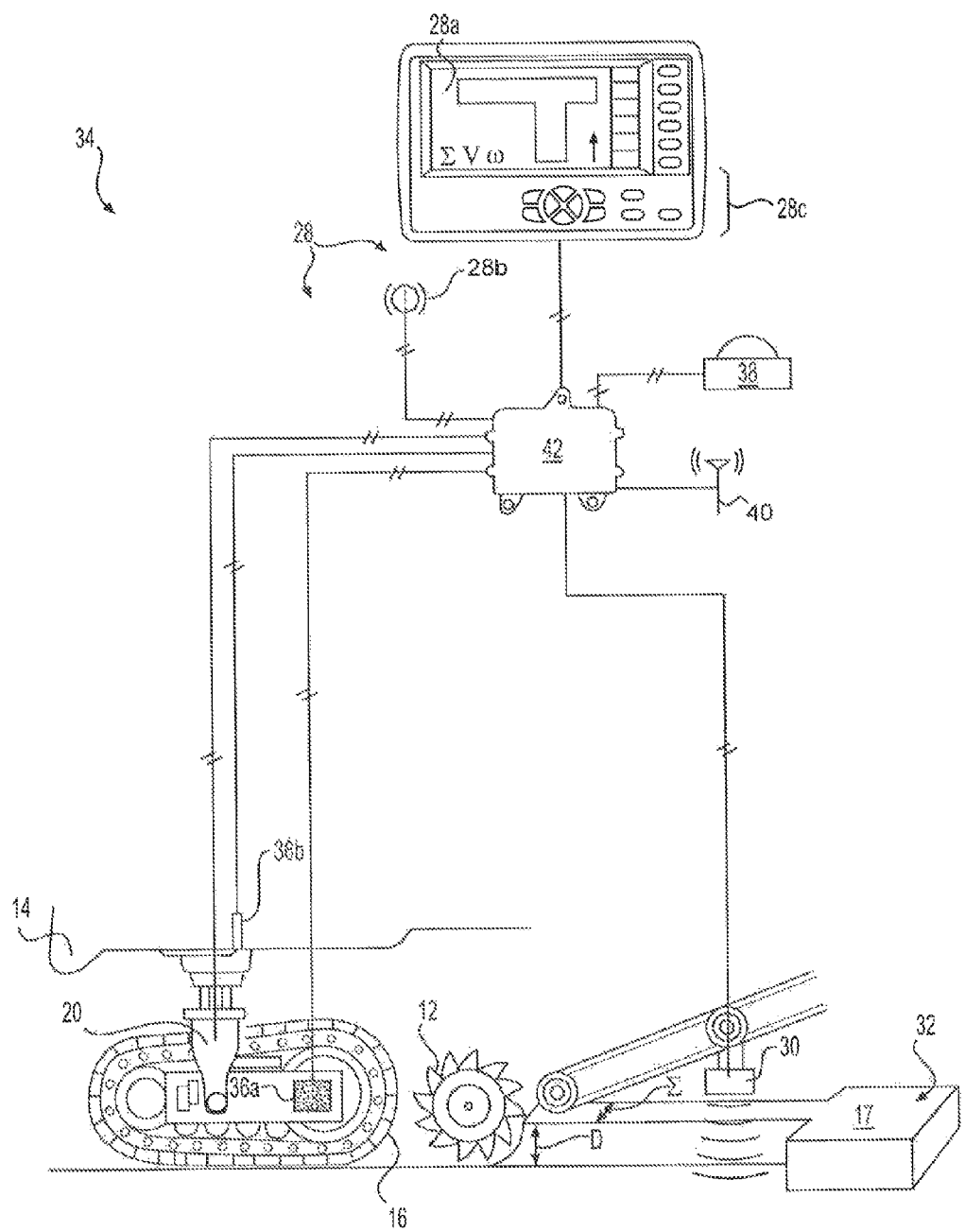
FIG. 2 is a diagrammatic illustration of an exemplary disclosed control system that may be used in conjunction with the cold planer of FIG. 1.

As illustrated in FIG. 2, a transport payload monitoring system 34 ("system") may be associated with cold planer 10 and include elements that cooperate to determine the volume of material discharged by cold planer 10 into haul vehicle 24. These elements may include interface devices 28, profile detection device 30, a speed sensor 36a, a depth sensor 36b, a locating device 38, a communication device 40, and a controller 42 connected with each of the other elements. Controller 42 may generate an electronic map of the width profile Σ of work surface 17 and show the electronic map on display 28a. Controller 42 may also determine the volume V of material that has been milled based on the width profile Σ, and show the volume V on display 28a. Based on the volume V and the density ρ of the milled material, controller 42 may be configured to determine the weight $W_m$ of the milled material and a fill level F of haul vehicle 24 and to display the volume V, weight $W_m$ and/or fill level F via display 28a. This information may be used by the operator and/or controller 42 to control operating parameters of cold planer 10 (e.g., travel speed, drum rotational speed, milling depth etc.) and/or to control dispatching of haul vehicle 24.

Speed sensor 36a may be associated with one or more traction devices 16, and may be configured to generate a signal indicative of a groundspeed of cold planer 10. For example, speed sensor may be a magnetic pickup-type sensor in communication with a magnet embedded within a rotational component of traction device 16. Speed sensor 36a may alternatively be associated with a different component of cold planer 10 (e.g., a driveshaft, a transmission, flywheel, etc.), or embody a different type of sensor. In other embodiments, speed sensor 36 may be a GPS device, Doppler device, or other type of position detecting device.

Depth sensor 36b may be associated with actuator 20 and configured to generate a signal indicative of the depth D of milling drum 12 below surface 17. For example, depth sensor 36b may be associated with actuators 20, and configured to generate a signal indicative of a height of frame 14. Based on the signal and known offsets between milling drum 12 and frame 14, controller 42 may be configured to determine the depth D of milling drum 12 below the top of work surface 17.

Locating device 38 may be configured to generate a signal indicative of a geographical position of the cold planer 10 relative to a local reference point, a coordinate system associated with the work area, a coordinate system associated with Earth, or any other type of 2-D or 3-D coordinate system. For example, locating device 38 may embody an electronic receiver configured to communicate with one or more satellites, or a local radio or laser transmitting system used to determine a relative geographical location of itself. Locating device 38 may receive and analyze high-frequency, low-power radio or laser signals from multiple locations to triangulate a relative 3-D geographical position. A signal indicative of this geographical position may then be communicated from locating device 38 to controller 42. The signal generated by locating device 38 may then be correlated with the profile detection signal from device 30 in order to track where cold planer 10 has milled portions of work surface 17 and where unmilled portions remain.

Communication device 40 may include hardware and/or software that enables sending and receiving of data messages between controller 42 and the offboard entity. The data messages may be sent and received via a direct data link and/or a wireless communication link, as desired. The direct data link may include an Ethernet connection, a connected area network (CAN), or another data link known in the art. The wireless communications may include satellite, cellular, infrared, and any other type of wireless communications that enables communication device 40 to exchange information.

Controller 42 may be configured to generate an electronic map of surface 17 based on the signal from device 30. The electronic map may include the width profile Σ of unmilled portions of surface 17, as well as portions that have already been milled. The width profile Σ shown on the map may indicate, for example, a width of surface 17 along a virtual line in front of milling drum 12. The map may also or alternatively include a 2-D representation of the width of work surface 17 in front of milling drum 12. In some embodiments, the map may also or alternatively include a 3-D representation of work surface 17, which may show the width of surface 17 in front of milling drum 12 as part of a volumetric representation of the space in front of milling drum 12. Based on the width profile Σ, the signals from input device 28c and sensors 36a, 36b, controller may be configured to determine the volume V and weight $W_m$ of the milled material, as well as a fill level F of haul vehicle 24.

Controller 42 may be configured to determine a total weight $W_{total}$ and the fill level F of haul vehicle 24 based on the volume V and weight $W_m$ of the milled material and known features of haul vehicle 24 (e.g., volumetric capacity, shape, tare weight, weight limit $W_L$, etc.). Controller 42 may be configured to show the fill level F and one or more of the volume V, weight $W_m$, and the map of the width profile Σ to the operator via display 28a to allow the operator to control cold planer based on the fill level F and how much material has been milled.

In some embodiments, controller 42 may be configured to automatically control some aspects of cold planer 10 and the milling process. For example, controller 42 may be configured to automatically control operations of cold planer 10 based on the fill level F of haul vehicle 24. That is, controller 42 may monitor the fill level F haul vehicle 24 and automatically slow or stop the movement of traction devices 16, milling drum 12, and/or conveyor system 22 as the fill level F approaches a threshold (e.g., 90% filled). It is understood that other thresholds may be used, if desired.

Controller 42 may also be configured to warn or otherwise notify the operator of cold planer 10 and/or the operator of haul vehicle 24 when the fill level F of haul vehicle 24 reaches a threshold. For example, when the fill level F reaches a threshold (e.g., 90% filled), controller 42 may generate a signal causing warning device 28b to visually or audibly notify the operator that haul vehicle 24 may soon reach the weight limit $W_L$. It is understood that greater or lower thresholds may be used, if desired. Controller 42 may be configured to change the warning signal in coordination with changes in the fill level F (e.g., as the fill level F increases) to allow warning device 28b to emit audible or visual warnings that are also coordinated with the changes in the fill level F.

In some embodiments, controller 42 may also be configured to manage communications between cold planer 10 and an offboard entity (e.g., haul vehicle 24, a central facility or another machine such as a trimming machine—not shown) via communication device 40. For example, controller 42 may transmit one or more of the volume V, weight $W_m$, the fill level F of haul vehicle 24, and the map of the width profile Σ offboard cold planer 10 for further processing and analysis. Controller may also be configured to command or request that a filled haul vehicle 24 be sent away and/or that an empty haul vehicle 24 be sent to cold planer 10 based on the fill level F. Controller 42 may also be configured to receive data and/or instructions via communication device 40 from offboard transmitters associated with computers, receptacles, or other machines.

For example, controller 42 may be configured to automatically receive various inputs, such as instructions, data, and/or other information from haul vehicle 24 (e.g., its maximum volume capacity, maximum tonnage or weight capacity, weight limit $W_L$, number of axles, current fill level F, a requested or target fill level F, legal weight limits $W_L$ associated with its travel path, etc.) via communication device 40. Controller 42 may be configured to communicate by wireless communication (e.g., RFID, cellular, Wi-Fi, or other radio communication) with haul vehicle 24. Controller 42 may also or alternatively store in its memory information regarding a particular receptacle (e.g., haul vehicle 24) or type of receptacle, and, based on identifying communications with the receptacle (e.g., RFID, etc.), look up information to be used during operations and calculation. Controller 42 may use this data and information to determine the total weight $W_{total}$ and fill level F of haul vehicle 24 during operation of cold planer 10.

Controller 42 may embody a single microprocessor or multiple microprocessors that include a means for monitoring operator and sensor input, and responsively adjusting operational characteristics of cold planer 10 based on the input. For example, controller 42 may include a memory, a secondary storage device, a clock, and a processor, such as a central processing unit or any other means for accomplishing a task consistent with the present disclosure. Numerous commercially available microprocessors can be configured to perform the functions of controller 42. It should be appreciated that controller 42 could readily embody a general machine controller capable of controlling numerous other machine functions. Various other known circuits may be associated with controller 42, including signal-conditioning circuitry, communication circuitry, and other appropriate circuitry. Controller 42 may be further communicatively coupled with an external computer system, instead of or in addition to including a computer system, as desired.

INDUSTRIAL APPLICABILITY

The disclosed control system may be used with any cold planer where accurately determining the volume of milled material is important. The disclosed control system may determine the volume of milled material by detecting a width profile of the surface in front of the cold planer yet to be milled and using that width profile to determine the volume and weight of milled material as cold planer traverses the surface. The disclosed control system may also determine the fill level of a receptacle receiving the milled material and its weight relative to regulated weight limits. The disclosed control system may further provide for mapping of milled and unmilled portions of a Jobsite, and communicating the volume and weight of the milled material, the fill level of the receptacle, and the map of the width profile offboard the cold planer. Operation of system 34 will now be explained.

During operation of cold planer 10, milling drum 12 may remove a portion of work surface 17 in the path of cold planer 10 as it traverses a desired portion of work surface 17. Several passes or "cuts" may be made in order to completely mill the desired portion of work surface 17. Each pass of cold planer 10 may be made at a desired ground speed, at a desired milling depth D, and cover a desired area of surface 17. Controller 42 may receive signals from speed sensor 36a, depth sensor 36b, and locating device 38 that are indicative of the ground speed, milling depth D, and position of cold planer 10, respectively.

During operation, controller 42 may also receive a signal from device 30 indicative of a width profile $\Sigma$ of surface 17. Device 30 may continuously monitor the space in front of milling drum 12 during operation to detect the width profile $\Sigma$ of work surface 17 that is yet to be milled. Based on the signals received from device 30, controller 42 may determine the width profile $\Sigma$, which may then be used to determine the volume V of material milled by cold planer 10 as it traverses surface 17.

Based on the geometry of surface 17 and/or the milling plan of cold planer 10, controller 42 may generate a 1-D, 2-D, or 3-D profile. For example, when the milling depth D is constant during the milling operation and surface 17 is flat and even, the width profile $\Sigma$ may be a 1-D profile indicative of the width of surface 17 along a particular virtual line in front of milling drum 12. When multiple passes are made at different milling depths (e.g., $D_0$-$D_3$ referring to FIG. 4) during the milling operation that result in a stepped surface 17, controller 42 may alternatively generate a 2-D or 3-D profile that is indicative of the width profile $\Sigma$, which may include the widths (e.g., $\omega_1$-$\omega_3$—referring to FIG. 3) of each portion of surface 17 at each depth. Controller 42 may also use the 3-D profile, if desired, to supply depth and distance data when velocity data, positioning data, and/or milling depth D data are otherwise unavailable.

As cold planer 10 traverses surface 17, controller 42 may determine the volume V of material milled by cold planer 10 and transferred into haul vehicle 24 based on the milling depth D, the ground speed, and the width profile $\Sigma$. For example, multiplying the width profile $\Sigma$ by the milling depth D may give a volume of milled material per unit distance traveled by cold planer 10. And multiplying the volume per unit distance by discrete distances traveled by cold planer 10 may give the volume of material milled over each distance. The distance traveled by cold planer 10 may be determined, for example, using information from locating device 38 (e.g., global positioning information), a summation ground speed multiplied by a time interval, or an odometer function of cold planer 10. It is understood that other ways of determining the distance traveled by cold planer 10 may be used. The volume V of milled material since the beginning of the milling operation may be determined by continually summing the volume of material milled over each discrete distance traveled by cold planer 10. Thus, an accurate determination of the volume V of milled material may be made without introducing errors, such as by estimating the width of each cut that is narrower than the width $\omega_m$ of milling drum 12.

As cold planer 10 traverses surface 17, milled material may be transferred into haul vehicle 24 via conveyor system 22 and transported away from the work area after haul vehicle 24 is full. Haul vehicle 24 may be full when the total weight $W_{total}$ of haul vehicle 24, including the weight $W_m$ of the milled material contained therein, reaches a maximum allowable weight, such as the weight limit $W_L$ selected by the operator or a legal weight limit. The weight $W_m$ of the milled material may be determined based on the volume V and the density $\rho$ of the milled material transferred into haul vehicle 24. For example, the weight $W_m$ of the milled material may be proportional to the product of the volume V and the density $\rho$ of the milled material. The volume V and density $\rho$ of the milled material may be determined using any known unit of measurement. For example, the volume V of milled material may be measured in cubic meters ($m^3$), cubic feet ($ft^3$), cubic yards ($yd^3$), etc. The density $\rho$ of milled material may, for example, be determined in kilograms per cubic meter (kg/m³), pounds per cubic foot (lb/ft³), pounds per cubic yard (lb/yd³), etc.

In one embodiment, determining the weight $W_m$ of the milled material may include receiving an operator selection of the density ρ of the milled material. For example, controller 42 may receive an operator selection indicative of the milled material density ρ, via input device 28c. That is, input device 28c may allow an operator to select one of several different density values stored in the memory of controller 42 that correspond to different types of milled materials. Such milled materials may include, for example, concrete, limestone asphalt, granite asphalt, etc. input device 28c may also or alternatively allow the operator to select whether the aggregate in the milled material was course or fine, which may decrease or increase the weight of the milled material, respectively. Input device 28c may also allow an operator to manually input a particular density ρ, if desired. In another embodiment, the density ρ of the milled material may be a single constant value stored in the memory of controller 42 and automatically used to determine the weight of the milled material.

The total weight $W_{total}$ of haul vehicle 24 may be equal to the tare weight $W_{tare}$ of haul vehicle 24 (i.e., the weight when empty) plus the weight $W_m$ of the milled material transferred into haul vehicle 24. The tare weight. $W_{tare}$ of haul vehicle 24 may, for example, be stored within the memory of controller 42. In some embodiments, controller 42 may store a number of tare weights that correspond to various types and sizes of receptacles. In a particular embodiment, controller 42 may receive an operator selection of a receptacle type via input device 28c, and controller 42 may determine the total weight $W_{total}$ of haul vehicle 24 based on the operator selection. For example, the operator may choose from a number of receptacle types, and each receptacle type may be associated with a known tare weight $W_{tare}$. Each receptacle type may also be associated with one or more additional features, such as for example, a maximum volume (e.g., a yardage), a model (e.g., model name, model number, etc.), a number of axles, a maximum weight rating (e.g., a tonnage), a shape or image of the receptacle, or other features. The operator may also or alternatively manually input the tare weight $W_{tare}$, maximum volume, or other information associated with haul vehicle 24 via input device 28c.

As cold planer 10 transfers milled material into haul vehicle 24, the fill level F of haul vehicle 24 may be determined based on the weight $W_m$ of the milled material and known features of haul vehicle 24. For example, controller 42 may continually add the weight $W_m$ of the milled material and the tare weight $W_{tare}$ of haul vehicle 24 to determine the total weight $W_{total}$ of haul vehicle 24. The total weight $W_{total}$ may be continually compared to the weight limit $W_L$ of haul vehicle 24 to determine the fill level F. For example, the fill level F may be the total weight $W_{total}$ of haul vehicle 24 as a percent of the weight limit $W_L$, as shown in EQ1 below.

$$F=100\times(1-(W_L-W_{total})/W_L) \quad \text{EQ1}$$

In some situations, the volume V and/or weight $W_m$ of milled material (as determined by controller 42) may not be equal to the instantaneous volume and/or weight of material that has been transferred into haul vehicle 24. For example, controller 42 may determine the instantaneous volume V and/or weight $W_m$ of milled material based on the signal from device 30, while additional time may pass before the milled material is actually transferred into haul vehicle 24 by conveyor system 22. The amount of time may depend on the belt speed of conveyor 24. Controller 42 may use the belt speed or other known parameters in conjunction with the instantaneous volume V and/or weight $W_m$ of milled material in order to more accurately determine the total volume V and/or weight $W_{total}$ of haul vehicle 24. In this way, material that has been milled but not yet transferred into haul vehicle (e.g., when conveyor system 22 stops during operation, when an operation is paused, etc.) may be excluded from the total weight $W_{total}$ of haul vehicle 24. Controller 24 may be configured to determine the amount of material that has been milled but not yet transferred into haul vehicle based on the belt speed and known geometry of conveyor system 22. Controller may display this amount of material (e.g., volume and/or weight) to the operator via display 28 to allow the operator to continue running conveyor system 22, for example, at the end of a milling operation in order to transfer all milled material into haul vehicle 24. Controller 42 may also be configured to automatically continue to run conveyor system 22 at the end of a milling operation in order to transfer all milled material into haul vehicle 42.

In other situations, some of the milled material may become lodged in the milling chamber that houses milling drum 12, which may create a difference between the volume V and/or weight $W_m$ of milled material and the actual volume and/or weight of material that has been transferred into haul vehicle 24. As material builds up in the chamber, thereby trapping less material over time, this difference may be lessened. Controller 42 may be configured to track an amount of time since the beginning of the milling operation or since a previous cleaning out of the milling chamber and apply a time-based factor to the volume V and/or weight $W_m$ of milled material in order to account for material that has been lodged in the milling chamber. The operator may also be allowed to provide input via input device 28c to indicate when the milling chamber has been cleaned out, thereby indicating to controller 42 to reset the time-based factor.

The weight limit $W_L$ of haul vehicle 24 may be a weight limit determined by the operator, fleet manager, or manufacturer (e.g., based on maximum volume, fuel efficiency, travel distance, etc.) for improving the overall efficiency of haul vehicle 24 and/or the milling operation. Controller 42 may receive an operator selection or manual entry of the weight limit $W_L$ via input device 28c and compare the weight limit $W_L$ to the maximum legal weight limit or other specified capacity limit stored within its memory or as provided by the operator via input device 28c. When the entered weight limit $W_L$ is less than or equal to the legal weight limit, controller 42 may determine the fill level F according to EQ1. However, when the weight limit $W_L$ is greater than the maximum legal weight limit, controller 42 may reduce the weight limit $W_L$ to the legal weight limit before determining the fill level F. It is understood that other ways of determining fill level F may be used, if desired.

The fill level F of haul vehicle 24 may be shown via display 28a to allow the operator to control cold planer 10 based on the fill level F of haul vehicle 24. This may allow the operator to avoid wastefully under-filling haul vehicle 24, while also avoiding over-filling haul vehicle 24 beyond its selected or legal weight limit $W_L$. For example, the operator may slow or stop the movement of traction devices 16, milling drum 12, and/or conveyor system 22 when the fill level F exceeds a threshold (e.g., 90% filled) or when haul vehicle 24 reaches a maximum allowable fill level and is full (e.g., when the fill level F reaches 100%). Display 28a may also or alternatively show other information relating to the milled material or the selected receptacle, such as the weight $W_m$ of milled material, the volume V of milled material, the selected density ρ, and/or features of haul vehicle 24, such as the total weight $W_{total}$, the model number, the shape or image, and/or other identifying features of haul vehicle 24.

Controller 42 may also or alternatively exercise automatic control over operations of cold planer 10 based on the fill level F of haul vehicle 24. For example, controller 42 may monitor the fill level F haul vehicle 24 and automatically reduce the amount of material being milled and transferred into haul vehicle 24 as the fill level F approaches a threshold (e.g., 90% filled) or when haul vehicle 24 reaches a maximum allowable fill level and is full (e.g., when the fill level F reaches 100%). Controller 42 may regulate how much material is being milled and transferred into haul vehicle 24, for example, by adjusting the movement of traction devices 16, milling drum 12, and/or conveyor system 22.

When the fill level F of haul vehicle 24 reaches a threshold (e.g., 90% filled), controller 42 may generate a signal causing warning device 28b to visually or audibly notify the operator of cold planer 10 that haul vehicle 24 may soon reach the weight limit $W_L$. It is understood that greater or lower thresholds may be used, if desired, in one embodiment, for example, warning device 28b may generate a visual or audible signal that changes as the fill level F changes. For example, a sound or light pattern emitted by warning device 28b may increase in speed or intensify as the fill level F increases, and may become fastest or most intense just before the weight limit $W_L$ is reached. In some embodiments, warning device 28b may additionally or alternatively be detectable by the operator of haul vehicle 24 or other personnel in the area of cold planer 10. In this way, the operators of cold planer 10 and of haul vehicle 24 and others may be notified when haul vehicle 24 is ready to be moved.

During operation, cold planer 10 may continually or periodically exchange data with offboard receivers and transmitters. In some embodiments, cold planer 10 may send one or more of the volume V of milled material, the weight $W_m$ of milled material, the fill level F of haul vehicle 24, a number of filled receptacles, efficiency data, other productivity data, and/or other information offboard cold planer 10 via communication device 40. For example, cold planer 10 may communicate data to an on or off-site back office computer for further analysis. Cold planer 10 may also communicate data and other information directly to receptacles or other machines, such as haul vehicle 24. For example, cold planer 10 may communicate the volume V, weight $W_m$, the fill level F, and/or other information to haul vehicle 24 for use by its operator and/or back office functions.

Several advantages may be associated with the disclosed control system. For example, because profile detection device 30 may be integrated into cold planer 10, accurate determinations of the volume of material being milled may be made for partial-width cuts as well as full-width cuts. In addition, because controller 42 may receive information about the type of material being milled (e.g., the density) and the receptacle receiving the milled material (e.g., haul vehicle 24), controller 42 may determine the fill level of the receptacle and indicate when the receptacle has been filled to a maximum legal weight or other desired weight limit. Further, because controller 42 may generate electronic data of milled material for partial- and full-width cuts, the volume and weight of the milled material and the fill level of the receptacle may be sent offboard for manual use or use by another machine or computer.

It will be apparent to those skilled in the art that various modifications and variations can be made to the disclosed system without departing from the scope of the disclosure. Other embodiments of the system will be apparent to those skilled in the art from consideration of the specification and practice of the conveyor system disclosed herein. It is intended that the specification and examples be considered as exemplary only, with a true scope of the disclosure being indicated by the following claims and their equivalents.

What is claimed is:

1. A control system for a cold planer having a milling drum and being configured to load material into a receptacle, the control system comprising:
   a depth sensor configured to generate a first signal indicative of a milling depth below a work surface;
   a speed sensor configured to generate a second signal indicative of a ground speed of the cold planer;
   a profile detection device mountable to the cold planer at a location forward of the milling drum and being configured to generate a third signal indicative of a width profile of the work surface;
   a communication device configured to receive input indicative of a loading capacity of the receptacle from an source external to the cold planer; and
   a controller in communication with the profile detection device, the depth sensor, the communication device, and the speed sensor, the controller being configured to:
      determine a volume of a milled material based on the first, second, and third signals;
      determine a weight of the milled material based on the volume of the milled material and a density; and
      determine a fill level of the receptacle as a function of the loading capacity based on at least one of the weight and the volume of the milled material.

2. The control system of claim 1, wherein the profile detection device is an ultrasonic sensor.

3. The control system of claim 1, wherein the profile detection device is a laser sensor.

4. The control system of claim 1, further including a display, wherein the controller is further configured to show the fill level of the receptacle on the display.

5. The control system of claim 1, wherein:
   the controller is further configured to communicate one or more of the volume of the milled material, the weight of the milled material, and the fill level of the receptacle offboard the cold planer.

6. The control system of claim 5, wherein the input indicative of the loading capacity includes one or more of a volume capacity, a weight capacity, a weight limit, a number of axles, and a fill level of the receptacle.

7. The control system of claim 1, further including an input device, wherein the controller is further configured to:
   receive an operator selection indicative of a material density via the input device; and
   determine the fill level of the receptacle based further on the received material density.

8. The control system of claim 1, further including an input device, wherein the controller is further configured to:
   receive an operator selection indicative of a receptacle type via the input device; and
   determine the fill level of the receptacle based further on the receptacle type.

9. The control system of claim 8, wherein the controller is further configured to:
   receive an operator selection indicative of a weight limit; and
   determine when the receptacle has reached a maximum allowable fill level based on the weight limit.

10. A method of operating a cold planer having a milling drum, comprising:
- determining a milling depth below a work surface;
- determining a ground speed of the cold planer;
- detecting a width profile of the work surface forward of the milling drum; and
- determining a volume of a milled material based on the milling depth, the ground speed, and the width profile;
- receiving input indicative of a loading capacity of a receptacle via a communication device from an source external to the cold planer;
- determining a weight of the milled material based on the volume of the milled material and a density; and
- determining a fill level of the receptacle as a function of the loading capacity based on at least one of the weight and the volume of the milled material.

11. The method of claim 10, wherein detecting the width profile includes detecting at least one of reflected light from a laser projected onto a surface forward of the milling drum, and ultrasonic waves reflected off the surface forward of the milling drum.

12. The method of claim 10, further including:
- displaying the fill level of the receptacle inside an operator station of the cold planer; and
- communicating one or more of the volume of the milled material, the weight of the milled material, and the fill level of the receptacle offboard the cold planer.

13. The method of claim 10, further including:
- receiving an input indicative of a material density; and
- determining the fill level of the receptacle based further on the material density.

14. The method of claim 10, further including:
- receiving an input indicative of a receptacle type; and
- determining the fill level of the receptacle based further on the receptacle type.

15. The method of claim 14, wherein receiving input indicative of the loading capacity of the receptacle includes receiving input indicative of a weight limit of the receptacle, and the method further includes determining when the receptacle has reached a maximum allowable fill level based on the weight limit.

16. A cold planer, comprising:
- a frame;
- a traction device connected to the frame and configured to propel the cold planer;
- a milling drum connected to the frame;
- a conveyor located adjacent the milling drum and configured to load milled material into a receptacle;
- an operator station supported by the frame;
- a depth sensor configured to generate a first signal indicative of a milling depth below a work surface;
- a speed sensor configured to generate a second signal indicative of a ground speed of the cold planer;
- a profile detection device mounted forward of the milling drum and being configured to generate a third signal indicative of width profile of the work surface;
- a communication device configured to receive input indicative of a loading capacity of the receptacle from an source external to the cold planer; and
- a controller in communication with the profile detection device, the depth sensor, the communication device, and the speed sensor, the controller being configured to:
  - determine a volume of a milled material based on the first, second, and third signals;
  - determine a weight of the milled material based on the volume and a density; and
  - determine a fill level of the receptacle as a function of the loading capacity based on at least one of the volume and the weight of the milled material.

* * * * *